United States Patent
Polachi

(10) Patent No.: US 10,380,636 B2
(45) Date of Patent: Aug. 13, 2019

(54) SYSTEMS AND METHODS FOR STATISTICAL DYNAMIC GEOFENCING

(71) Applicant: eBay Inc., San Jose, CA (US)

(72) Inventor: Neala F. Polachi, Boston, MA (US)

(73) Assignee: eBay Inc., San Jose, CA (US)

( * ) Notice: Subject to any disclaimer, the term of this patent is extended or adjusted under 35 U.S.C. 154(b) by 82 days.

(21) Appl. No.: 13/707,316

(22) Filed: Dec. 6, 2012

(65) Prior Publication Data

US 2014/0164118 A1    Jun. 12, 2014

(51) Int. Cl.
*G06Q 30/02* (2012.01)
*G06Q 30/00* (2012.01)

(52) U.S. Cl.
CPC ..... *G06Q 30/0259* (2013.01); *G06Q 30/0261* (2013.01)

(58) Field of Classification Search
CPC ............... G06Q 30/02; G06Q 30/0259; G06Q 30/0246; G06Q 30/0261; G06Q 30/0207–30/0277
USPC ..... 705/14.57, 14.45, 14.58, 14.64, 14, 319; 455/456.3
See application file for complete search history.

(56) References Cited

U.S. PATENT DOCUMENTS

| | | | |
|---|---|---|---|
| 6,647,257 B2 | 11/2003 | Owensby | |
| 8,019,532 B2 | 9/2011 | Sheha | |
| 8,335,524 B2 * | 12/2012 | Shutter | ...... 455/456.3 |
| 2006/0200305 A1 * | 9/2006 | Sheha et al. | ......... 701/200 |
| 2006/0253481 A1 * | 11/2006 | Guido et al. | .......... 707/100 |
| 2006/0270421 A1 * | 11/2006 | Phillips | ...... G08B 21/0236 |
| | | | 455/457 |
| 2009/0197582 A1 * | 8/2009 | Lewis | ............ H04W 4/02 |
| | | | 455/414.2 |

(Continued)

FOREIGN PATENT DOCUMENTS

| | | |
|---|---|---|
| KR | 1020120054671 A | 5/2012 |
| WO | WO-2014089462 A2 | 6/2014 |
| WO | WO-2014089462 A3 | 6/2014 |

OTHER PUBLICATIONS

"Australian Application Serial No. 2013355021, First Examiner Report dated Feb. 29, 2016", 3 pgs.

(Continued)

*Primary Examiner* — Matthew T Sittner
*Assistant Examiner* — Richard G Reinhardt
(74) *Attorney, Agent, or Firm* — SBMC

(57) ABSTRACT

Systems and methods for statistical dynamic geofencing are discussed. For example, a method for statistical dynamic geofencing can include operations such as receiving a location-based campaign request, analyzing demographic data, determining a geofence parameter, generating a geofence, and distributing location-aware advertisements. The location-based campaign request can include a list of points of interest (POIs) and a target demographic parameter. The demographic data can include data from geographic areas surrounding at least a portion of the POIs as well as data related to the target demographic parameter. The geofence can be generated based at least in part on the geofence parameter, where the geofence parameter directly affects either the size or shape of the geofence. The location-aware advertisements are distributed to a plurality of mobile devices determined to be within the geofence.

20 Claims, 9 Drawing Sheets

(56) References Cited

U.S. PATENT DOCUMENTS

| | | | | |
|---|---|---|---|---|
| 2012/0054028 A1* | 3/2012 | Tengler et al. | ............ | 705/14.49 |
| 2012/0129553 A1* | 5/2012 | Phillips et al. | ............ | 455/456.3 |
| 2012/0265841 A1* | 10/2012 | Ross | ............ | H04W 4/029 |
| | | | | 709/217 |
| 2012/0276928 A1* | 11/2012 | Shutter | ............ | G06Q 30/02 |
| | | | | 455/456.3 |
| 2014/0095296 A1* | 4/2014 | Angell et al. | ............ | 705/14.45 |
| 2014/0156410 A1* | 6/2014 | Wuersch et al. | ............ | 705/14.58 |

OTHER PUBLICATIONS

"Australian Application Serial No. 2013355021, Office Action dated Sep. 15, 2016", 3 pgs.

"Australian Application Serial No. 2013355021, Response filed May 30, 2016 to First Examiner Report dated Feb. 29, 2016", 22 pgs.

"Australian Application Serial No. 2013355021, Response filed Sep. 13, 2016 to Subsequent Examiners Report dated Jun. 6, 2016", 11 pgs.

"Australian Application Serial No. 2013355021, Response filed Sep. 20, 2016 to Office Action dated Sep. 15, 2016", 4 pgs.

"Australian Application Serial No. 2013355021, Subsequent Examiners Report dated Jun. 6, 2016", 3 pgs.

"Canadian Application Serial No. 2,894,142, Office Action dated Jun. 14, 2016", 3 pgs.

"Canadian Application Serial No. 2,894,142, Response filed Dec. 8, 2016 to Office Action dated Jun. 14, 2016", 25 pgs.

Office Action received for Canadian Patent Application No. 2,894,142, dated Jun. 13, 2018, 6 pages.

Response to Office Action filed on Oct. 17, 2017, for Canadian Patent Application No. 2,894,142, dated May 10, 2017, 3 pages.

Response to Office Action filed on Jul. 19, 2018, for Canadian Patent Application No. 2,894,142, dated Jun. 13, 2018, 4 pages.

International Preliminary Report on Patentability and Written Opinion received for PCT Application No. PCT/US2013/073627, dated Jun. 18, 2015, 8 pages.

"International Application Serial No. PCT/US2013/073627, International Search Report dated Jul. 18, 2014", 3 pgs.

"International Application Serial No. PCT/US2013/073627, Written Opinion dated Jul. 18, 2014", 6 pgs.

"Canadian Application Serial No. 2,894,142, Office Action dated May 10, 2017", 4 pgs.

Office Action received for Canada Patent Application No. 2,894,142, dated Apr. 25, 2019, 7 pages.

* cited by examiner

SYSTEMS AND METHODS FOR STATISTICAL DYNAMIC GEOFENCING

TECHNICAL FIELD

This application relates generally to data processing within a network-based system operating over a distributed network or data processing on a mobile device, and more specifically to systems and methods for implementing statistical dynamic geofencing.

BACKGROUND

The ever increasing use of smart phones, such as the iPhone® (from Apple, Inc. of Cupertino, Calif.), with data connections and location determination capabilities is slowly changing the way people interact, shop for products and services, and even manage accounts. Smart phones can provide users with nearly instant information regarding a wide range of information, such as product availability, friend locations, or pricing. For example, applications such as RedLaser™ (from eBay, Inc. of San Jose, Calif.) allow a smart phone user to scan a bar code and instantly check prices across online and local retail outlets. Smart phones also commonly include mechanisms, such as global positioning system (GPS) receivers, that allow the devices to constantly update location information. These technology changes are also driving changes in the way merchants and brand advertisers target and deliver advertising, particularly mobile advertising.

BRIEF DESCRIPTION OF THE DRAWINGS

Some embodiments are illustrated by way of example and not limitation in the figures of the accompanying drawings in which.

DEFINITIONS

Figure 1:
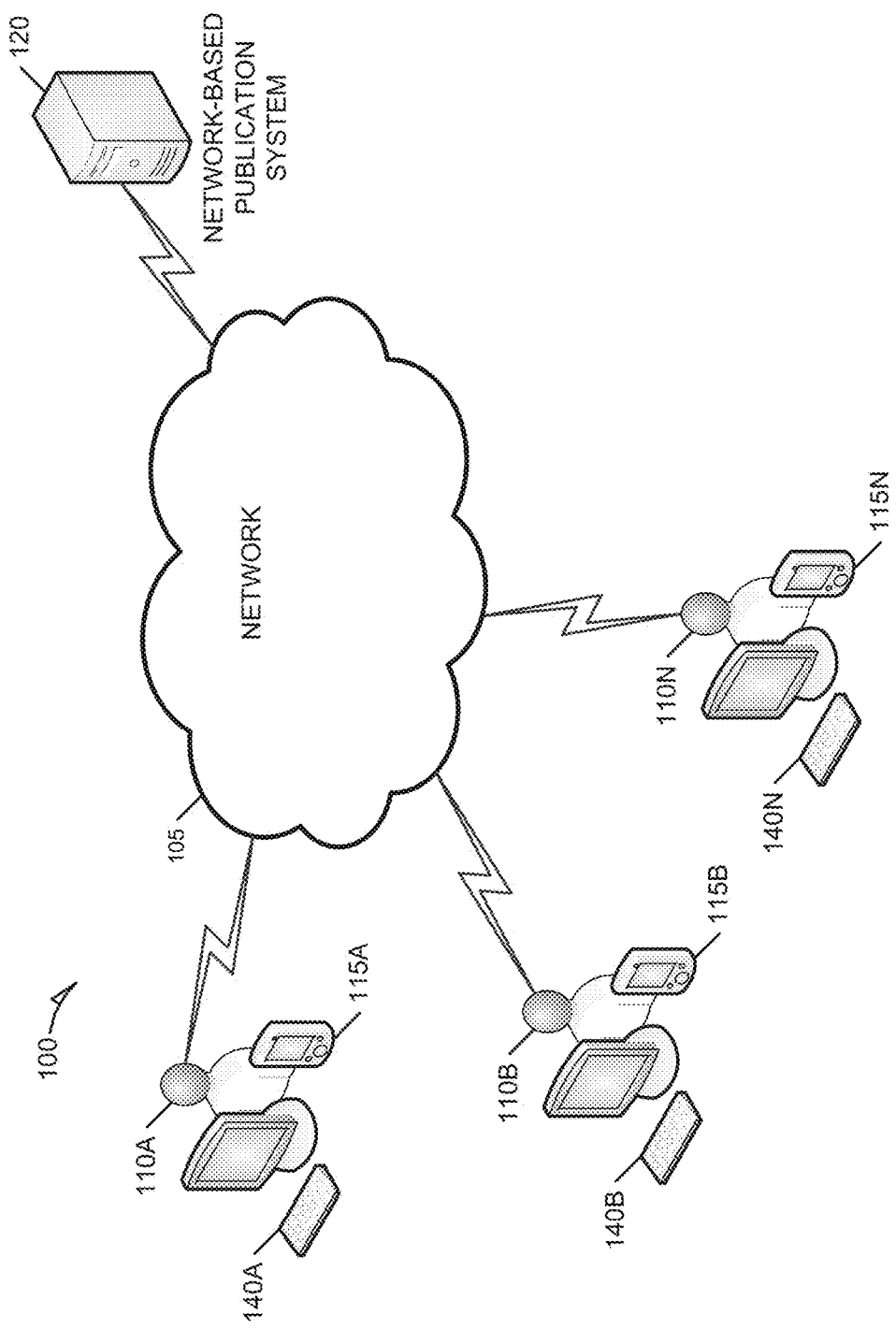
FIG. 1 is a block diagram depicting a system for using statistical dynamic geofences to assist in targeted publication distribution, according to an example embodiment.

Location—For the purposes of this specification and the associated claims, the term "location" is used to refer to a geographic location, such as a longitude/latitude combination or a street address. The term location is also used within this specification in reference to a physical location associated with a merchant, an event, or other similar physical destination.

Point of Interest (POI)—For the purposes of this specification and the associated claims, the term is used in a manner similar to location, and refers to or identifies a geographic (physical) location. For example, a POI may be a retail store, such as Starbucks, and may identify that retail store by name, address, GPS coordinates, or any other known method of identifying a unique physical location.

Real-time—For the purposes of this specification and the associated claims, the term "real-time" is used to refer to calculations or operations performed on the fly as events occur or input is received by the operable system. However, the use of the term "real-time" is not intended to preclude operations that cause some latency between input and response, so long as the latency is an unintended consequence induced by the performance characteristics of the machine.

Context—For the purposes of this specification and the associated claims, the term "context" is used to refer to environmental inputs, such as location, time, and weather conditions, among others. The context generally refers to conditions describing an individual's (e.g., user's) environment and/or activities. For example, context information can include a user's location, direction of movement, current activity (e.g., working, driving, playing golf, shopping, etc.), current weather conditions, time of day, and time of year (e.g., season), among other things. In certain examples, context information about a user can also include past events, purchase history, or other historical data about the user.

Geofence—For the purposes of this specification and the associated claims, the term "geofence" is used to refer to various regions or boundaries of interest that include a geographic area within a distance or travel time to a point of interest. However, a geofence need not be limited to any geometric shape or an arbitrary boundary drawn on a map. A geofence can be used to determine a geographical area of interest for calculation of demographics, advertising, or similar purposes. Geofences can be used in conjunction with the advertisement generation and delivery concepts discussed herein. For example, a geofence can be used to assist in determining whether a user (or mobile device associated with the user) is within a geographic area of interest to a particular advertiser (e.g., a local merchant) or capable of traveling to the particular advertiser in a specified period of time. If the user is within a geofence established by the merchant, the systems discussed herein can use that information to generate a dynamic advertisement from the advertiser and deliver the offer to the user (e.g., via a mobile device associated with the user).

Additional detail regarding providing and receiving location-based services, including geo-location and geofence concepts, can be found in U.S. Pat. No. 7,848,765, titled "Location-Based Services," granted to Phillips et al., which is hereby incorporated by reference.

DETAILED DESCRIPTION

Example systems and methods are described for using statistical dynamic geofencing for targeting publication delivery to mobile devices, among other things. Also described are systems and methods for generating, updating, and utilizing statistical dynamic geofences. In the following description, for purposes of explanation, numerous specific details are set forth in order to provide a thorough understanding of example embodiments. It will be evident, however, to one skilled in the art, that the present invention may be practiced without these specific details. It will also be evident that statistical dynamic geofencing is not limited to the examples provided and may include other scenarios not specifically discussed.

Geofences can be used within a location-aware publication system to target publications for distribution within limited geographical areas. Geofences can be defined in terms of GPS coordinates (e.g., latitude and longitude) combined with a radius measured in meters or feet, for example. Alternatively, geofences can also be defined according to a series of GPS coordinates defining a bounding box. In yet other examples, a geofence can be any geometric shape defined by a mathematical formula and anchored by a GPS coordinate. Other methods of defining, maintaining, and using geofences can be used without limitation with the systems and methods discussed herein.

One challenge identified by the inventors in effective use of geofences for targeting publication distribution can include accurately predicting whether the geofence is likely to include target consumers who are likely to respond to the publication. A solution to this challenge can include the use of statistical analysis of demographic data, such as census data, in geographic areas of interest to determine optimal geofence size, shape, and even placement. Targeting publications, such as advertisements, for distribution within limited geographical areas can allow merchants and other advertisers to selectively target publications based on statistical analysis of data, such as demographic data.

With the increased popularity of mobile devices, such as the iPhone®, with location-aware capabilities, the usefulness of location-aware publication systems has increased. Location-aware publication systems can receive location data on mobile devices directly from individual mobile devices or from a carrier, such as AT&T or Verizon. In some examples, the location data may also include, or be able to be correlated with, demographic data associated with the users of the mobile devices. In such examples, a location-aware publication system can analyze historical trends in location and demographic data to generate geofences to target locations around POIs.

In an example, a coffee franchise may want to target certain demographic characteristics (target demographic parameters) of potential customers around each franchise location. A location-aware publication system can utilize general census-type demographic data to initially generate a set of geofences around (or associated with) each of the target POIs. In an example, the demographic characteristic might be average income, and the publication system can analyze demographic data in geographic areas surrounding a POI to determine the size and/or shape required for a geofence to encompass a certain predicted number or density of individuals with the target demographic (e.g., average income over $80,000/year). In certain examples, the geofence may not be centered on a particular POI, but rather allowed to float within a defined geographic area in order to best capture the target demographic. In these examples, the defined float geography can be centered or otherwise tied to one or more POIs, in order to ensure that the targeted audience is within a certain distance of an advertiser's physical locations.

In these examples, the target demographics can include population density, average income, age ranges, percentage of male or females, average education level, active mobile device usage, or any other similar demographic characteristic. Geofences can also be generated based on other data susceptible to statistical analysis, such as competitors (locations or density) or WiFi hotspots, among other things. Some additional example target demographics can include: household income, marital status, sex, age, ethnicity, race, profession, average number of children, no children, median age, and male/female median age, among other things. Data sources for demographic data can include United States government collected census data, such as is available within a ZIP code database (from ZIP-CODES.COM, www.zip-codes.com/zip-code-database.asp (last visited Dec. 5, 2012)).

In certain examples, statistical dynamic geofences can be generated and subsequently updated based on one or more target parameters. Referring back to the coffee franchise example, once an initial geofence has been generated and used to target distribution of a mobile advertisement, response results to the advertisement can be monitored and analyzed to update subsequent geofences for targeting future advertisement distribution. For example, the publication system can monitor click-throughs (or similar indications of interest in the distributed advertisement) and correlate the click-throughs with demographic data to determine whether the advertisement is reaching the target audience. Based on analysis of the click-through-related demographic data, the size or shape of the geofence can be updated in an attempt to increase the predicted number of target recipients matching a certain characteristic.

In other examples, demographic data analysis may determine that the size or shape of a geofence should shift over the course of a day. For example, between the hours of 7:00 AM and 9:00 AM, the demographic data may indicate that target population density is high, allowing for a small radius geofence to be used in delivering targeted publications (e.g., advertisements or coupon offers). However, between 9:01 AM and 3:00 PM, the demographic data may indicate that a much larger radius needs to be considered to capture a similar potential audience. In this example, the dynamic geofence may change in size depending upon time of day of distribution by the publication system.

Example System

FIG. 1 is a block diagram depicting a system 100 for using statistical dynamic geofences to assist in targeted publication distribution, according to an example embodiment. In an example, system 100 can include users 110A-110N (collectively referred to as either user 110 or users 110 depending upon context) and a network-based publication system 120. In an example, the users 110A-110N can connect to the network-based publication system 120 via mobile devices 115A-115N (collectively referred to as mobile device 115). Users 110A-110N can also connect to the network-based publication system 120 via clients 140A-140N (collectively referred to as client 140 or clients 140). In certain examples, users 110 can receive publications, on mobile devices 115 or clients 140, from the network-based publication system 120 transmitted over network 105, but the users 110 may not otherwise make any sort of direct connection with the network-based publication system 120.

In an example, the users 110 can configure an account on the network-based publication system 120. The account can be accessed by a user, such as user 110A, using mobile device 115A or client 140A, if user 110A meets the specified access criteria or rules. In an example, the access rules can include user identification and/or mobile device identification. A user account on the network-based publication system 120 can allow the user to define specific POIs of interest or provide other user data that can be used by the network-based publication system 120 for targeting publications. In some examples, the network-based publication system 120 can monitor user behavior and create geofences based on past and predicted user behaviors. In certain examples, the network-based publication system 120 can be used by merchants as a location-based advertising platform, where users, such as users 110, opt-in to location-based advertisements. For example, Best Buy (of Minneapolis, Minn.) may use the network-based publication system 120 to provide location-based advertising to users 110 via mobile devices 115. In this example, the network-based publication system 120 can use statistical dynamic geofences, as discussed herein, to target a geographic area that is likely to include a segment of users 110 that meet a target demographic parameter. In this example, Best Buy would define an advertising campaign that includes a target demographic and a list of POIs relevant to the campaign.

Example Operating Environment

Figure 2:
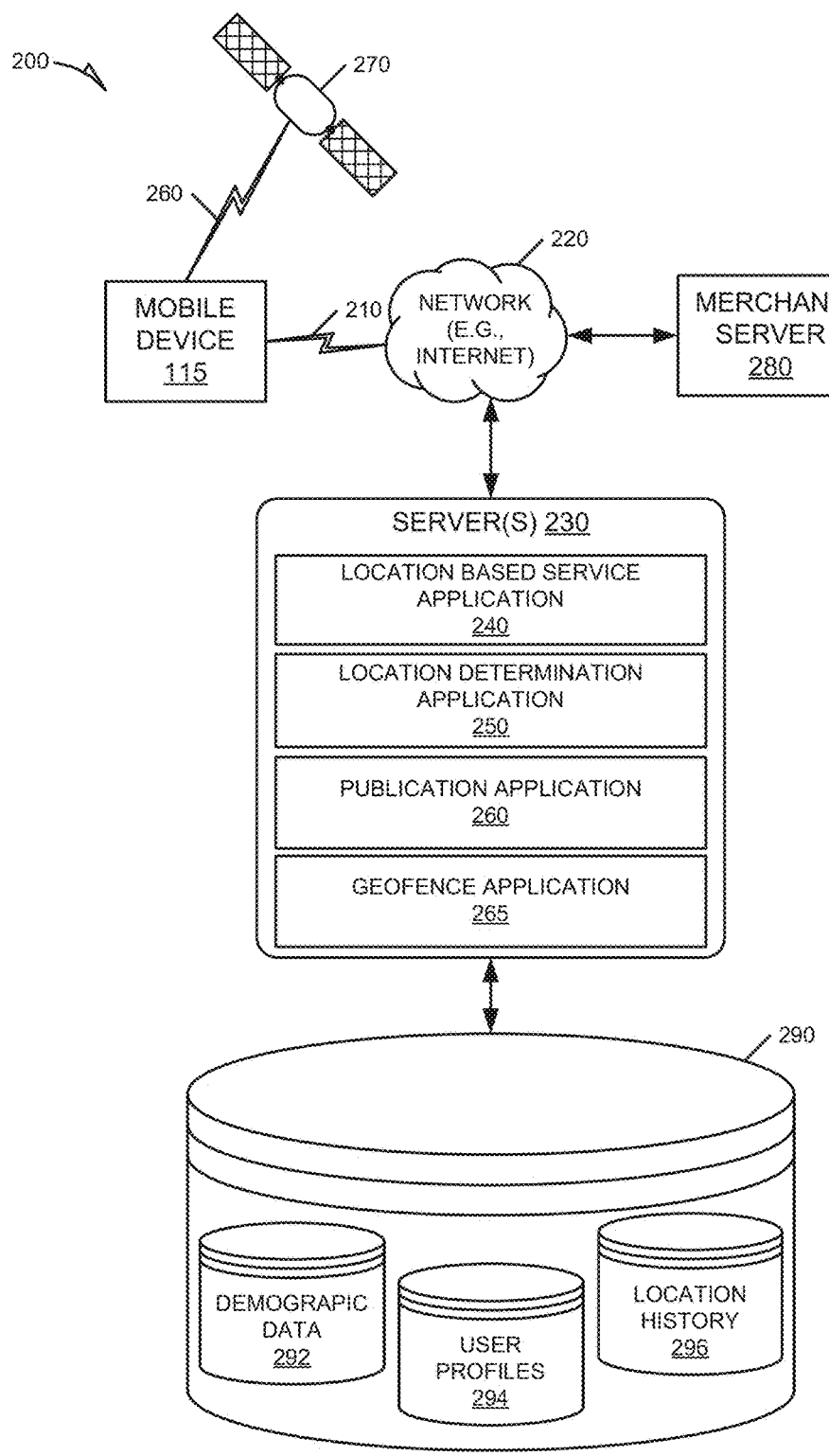
FIG. 2 is a block diagram illustrating an environment for operating a mobile device, according to an example embodiment.

FIG. 2 is a block diagram illustrating an environment 200 for operating a mobile device 115, according to an example embodiment. The environment 200 is an example environment within which methods for using statistical dynamic geofences can be implemented. The environment 200 can include a mobile device 115, a communication connection 210, a network 220, servers 230, a communication satellite 270, a merchant server 280, and a database 290. The servers 230 can optionally include location based service application (LBS) 240, location determination application 250, publication application 260, and geofence application 265. The database 290 can optionally include demographic data 292, user profiles 294, and/or location history 296. The mobile device 115 represents one example device that can be utilized by a user to receive publications. The mobile device 115 may be any of a variety of types of devices (for example, a cellular telephone, a personal digital assistant (PDA), a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or other types of networks).

In another example, the connection 210 may be a Wi-Fi or IEEE 802.11x type connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute LBS applications 240, which intemperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 240 can provide location data to a network-based publication system 120, which can then be used to provide location-aware publications from the network-based publication system 120, where servers 230 can be operating with the network-based publication system 120. Knowledge of the device's location, and/or the location of other devices, may be obtained through interoperation of the mobile device 115 with a location determination application 250 executing on one or more of the servers 230. Location information may also be provided by the mobile device 115, without use of a location determination application, such as application 250. In certain examples, the mobile device 115 may have some limited location determination capabilities that are augmented by the location determination application 250. In some examples, the servers 230 can also include publication application 260 for providing location-aware publication of data such as advertisements or offers. In certain examples, location data can be provided to the publication application 260 by the location determination application 250. In some examples, the location data provided by the location determination application 250 can include merchant information (e.g., identification of a retail location). In certain examples, the location determination application 250 can receive signals via the network 220 to further identify a location. For example, a merchant may broadcast a specific IEEE 802.11 service set identifier (SSID) that can be interpreted by the location determination application 250 to identify a particular retail location. In another example, the merchant may broadcast an identification signal via radio-frequency identification (RFID), near-field communication (NFC), or a similar protocol that can be used by the location determination application 250. In addition to examples using these various mechanisms to identify a particular location, these mechanisms (e.g., SSIDs, RFIDs NFC, and on forth) can be used as secondary authentication factors, which are discussed in more detail below.

In certain examples, the geofence application 265 can leverage the LBS application 240 or the location determination application 250 to assist in generating and/or updating geofences based on current or historical statistics.

Example Mobile Device

Figure 3:
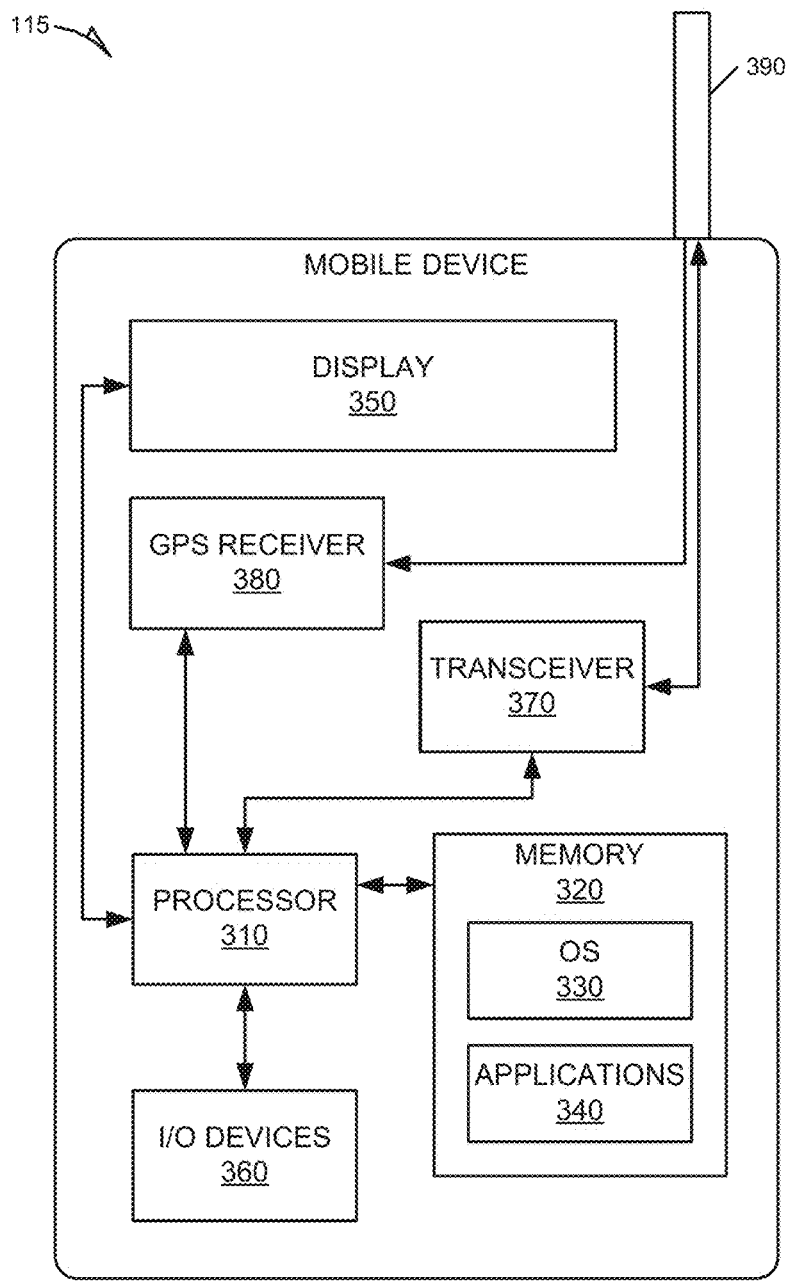
FIG. 3 is a block diagram illustrating a mobile device, according to an example embodiment.

FIG. 3 is a block diagram illustrating the mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Example Platform Architecture

Figure 4:
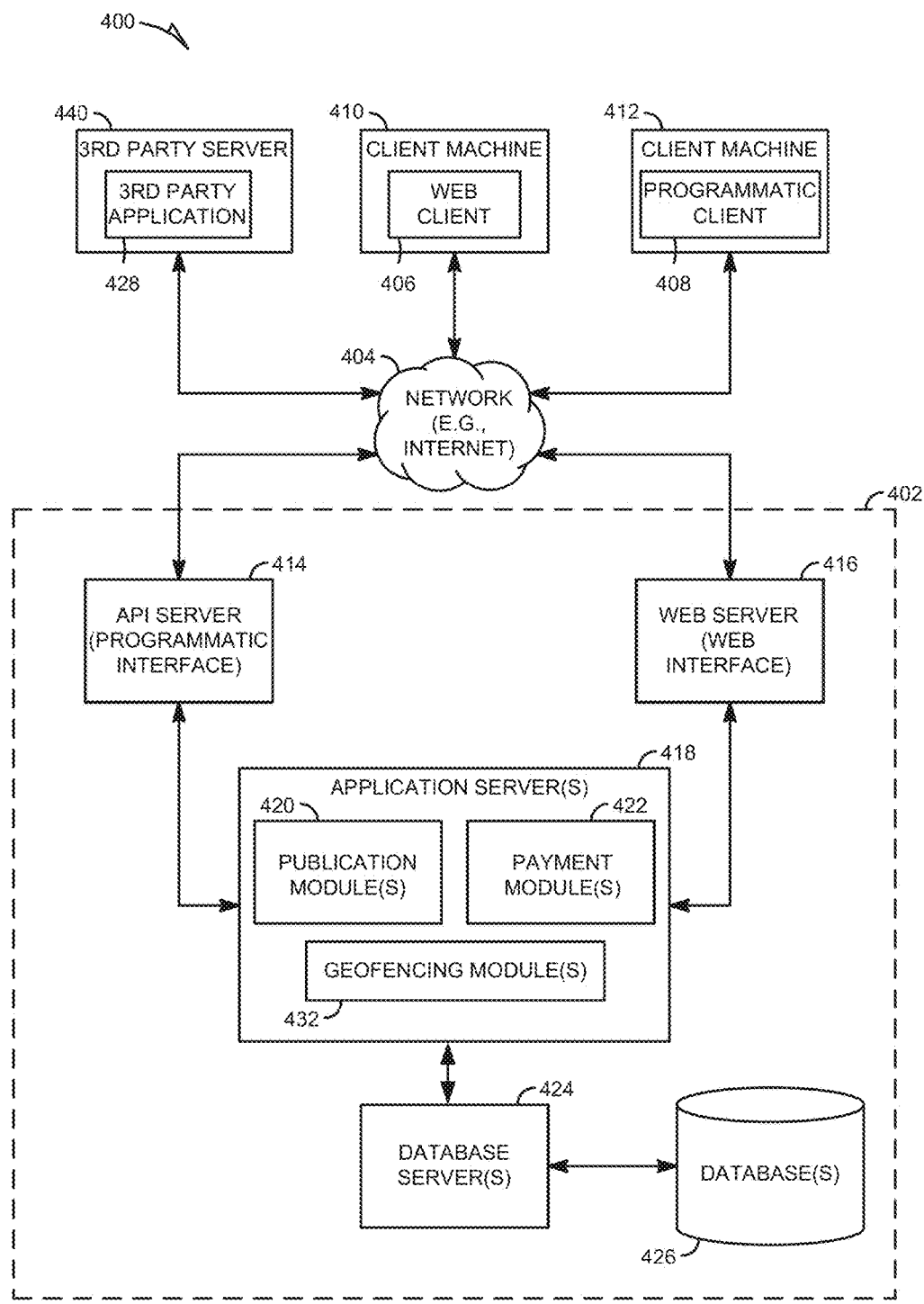
FIG. 4 is a block diagram illustrating a network-based system for using statistical dynamic geofences to assist in targeted publication distribution, according to an example embodiment.

FIG. 4 is a block diagram illustrating a network-based system 400 for using statistical dynamic geofences to assist in targeted publication distribution, according to an example embodiment. The block diagram depicts a network-based system 400 (in the exemplary form of a client-server system), within which an example embodiment can be deployed. A networked system 402 is shown, in the example form of a network-based location-aware publication or payment system, that provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Wash. State) and a programmatic client 408 (e.g., PAYPAL payments smart phone application from PayPal, Inc. of San Jose, Calif.) executing on respective client machines 410 and 412. In an example, the client machines 410 and 412 can be in the form of a mobile device, such as mobile device 115. In yet another example, the programmatic client 408 can be the RedLaser mobile shopping application from eBay, Inc. of San Jose, Calif.

An Application Programming Interface (API) server 414 and a web server 416 are coupled to, and provide programmatic and web interfaces respectively to, one or more application servers 418. The application servers 418 host one or more publication modules 420 (in certain examples, these can also include commerce modules, advertising modules, and marketplace modules, to name a few), payment modules 422, and geofencing modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication functions and services to users who access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 can also be configured to facilitate payment processing based on geofence detection and work in conjunction with the geofence modules 432. The geofencing modules 432 may provide generation and updating of statistical dynamic geofences, among other things. While the publication modules 420, payment modules 422, and geofencing modules 432 are shown in FIG. 4 to all form part of the networked system 402, it will be appreciated that, in alternative embodiments, the payment modules 422 may form part of a payment service that is separate and distinct from the networked system 402.

Further, while the system 400 shown in FIG. 4 employs client-server architecture, the present invention is of course not limited to such an architecture, and could equally well find application in a distributed, or peer-to-peer, architecture system, for example. The various publication modules 420, payment modules 422, and geofencing modules 432 could also be implemented as standalone systems or software programs, which do not necessarily have networking capabilities.

The web client 406 accesses the various publication modules 420, payment modules 422, and geofencing modules 432 via the web interface supported by the web server 416. Similarly, the programmatic client 408 accesses the various services and functions provided by the publication modules 420, payment modules 422, and geofencing modules 432 via the programmatic interface provided by the API server 414. The programmatic client 408 may, for example, be a smart phone application (e.g., the PAYPAL payments application) that enables users to process payments directly from their smart phones leveraging user profile data and current location information provided by the smart phone or accessed over the network 404.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the geofencing modules 432 for advertising or marketing purposes (e.g., location-aware publication targeting).

Example Geofencing Modules

Figure 5:
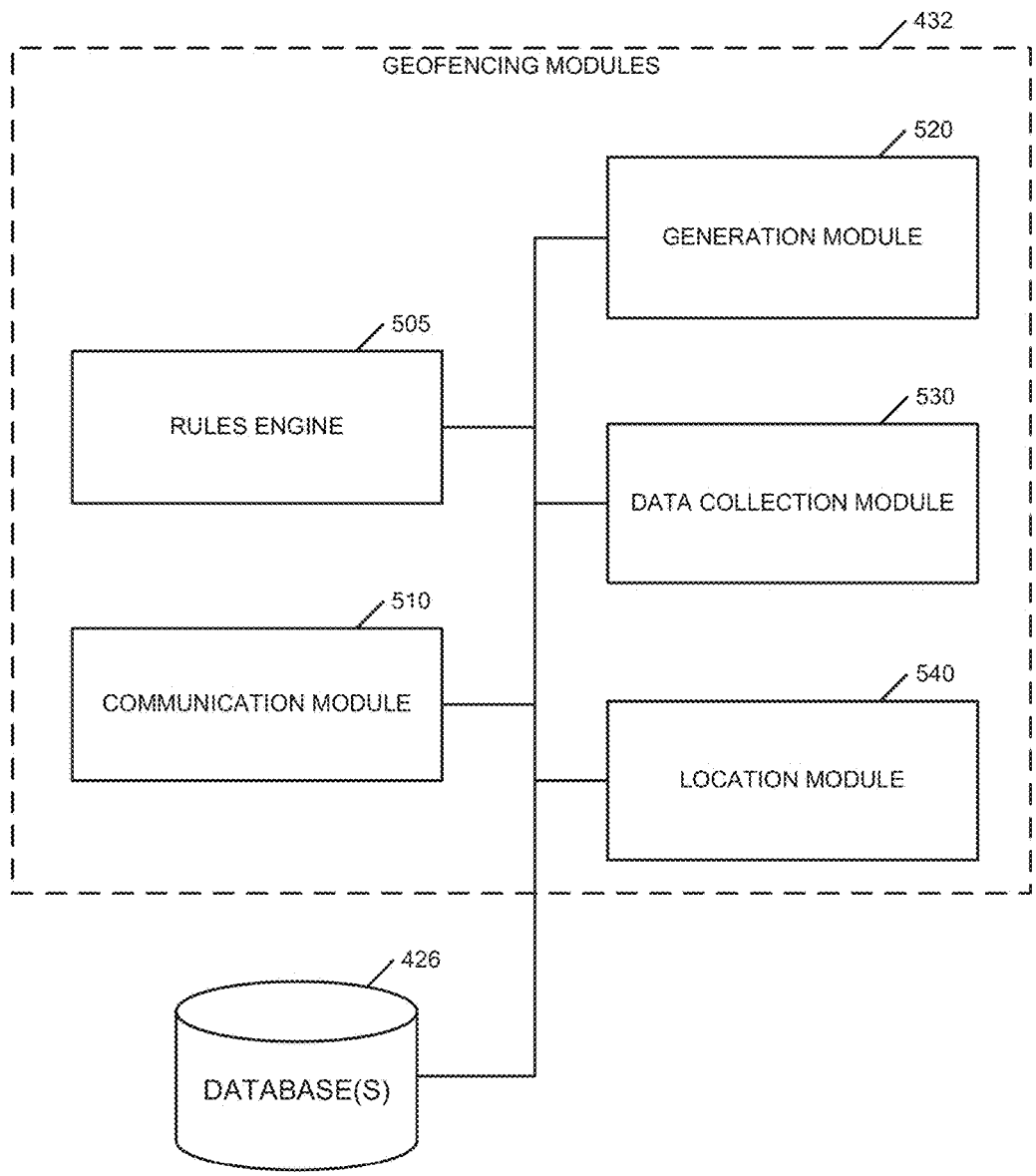
FIG. 5 is a block diagram illustrating geofencing modules, according to an example embodiment.

FIG. 5 is a block diagram illustrating geofencing modules 432, according to an example embodiment. In this example, the geofencing modules 432 can include a rules engine 505, a communication module 510, a generation module 520, a data collection module 530, and a location module 540. In an example, the geofencing modules 432 can access database 426 to store and/or retrieve generation rules, user profile data, location data, and demographic data, as well as other information, to enable statistical dynamic geofencing.

In an example, the rules engine 505 can be configured to manage and evaluate rules controlling geofence generation and updating. Rules can be provided by an advertiser for each campaign run on the networked system 402. As discussed above, one of the "rules" can define the type of statistical analysis as well as the target demographic (or similar data set) to be used in generating or updating a geofence. For example, a geofence rule may correlate the geofence radius to population density of the target geographical area. In this example, the lower the population density, the larger the radius of the resulting geofence.

Accordingly, for a franchisee with locations in different geographic areas, such a rule can allow for locations in low density areas and locations in high density areas to still fall within a single advertising campaign while maintaining a similar average number of impressions for distributed advertisements.

In an example, the communication module 510 can be configured to manage communications between the geofencing modules 432 and a user, where the user is communicating via the mobile device 115 or the client 140. The communication module 510 can also be configured to manage communications between the geofencing modules 432 and a merchant or advertiser.

In an example, the generation module 520 is configured to generate and update geofences according to information provided by modules, such as the data collection module 530, the location module 540, and the rules engine 505.

In an example, the data collection module 530 is configured to collect data related to a publication or advertising campaign. In certain examples, the data collection module 530 can collect data detailing the results of an advertisement distribution, such as number of impressions and click-throughs. Impressions can indicate the number of times a mobile device displayed the advertisement, while, click-throughs can indicate the number of users that interacted with an advertisement (e.g., clicked the ad). In certain examples, the data collection module 530 can aggregate results data and, in some cases, correlate demographic data related to the users with the advertising results.

In an example, the location module 540 is configured to receive location data from a mobile device, such as mobile device 115, and determine from the location data a current physical location, which may include reference to landmarks or other sites of interest. In some examples, the location module 540 can receive GPS-type coordinates (e.g., longitude and latitude), which can be used to establish a current location associated with a mobile device (and, thus, a user of the mobile device). Using the longitude and latitude coordinates, the location module 540 can determine if the current location is within a geofence, for example. In another example, some merchants may broadcast specific wireless network signals that can be received by a mobile device, such as mobile device 115. Once received, the mobile device 115 can include programming or circuitry to translate the signal into a specific location, or the mobile device 115 can simply retransmit the unique signal to the location module 540. In an example, a merchant location can transmit a unique SSID, which the location module 540 can be programmed to interpret as identifying a specific merchant location. In another example, the merchant may broadcast a unique SSID within all of its locations and the location module 540 can be programmed to use a combination of the unique SSID and other location data (e.g., GPS coordinates or cell tower locations) to identify a specific location Additional details regarding the functionality provided by the geofencing modules 432 are detailed in reference to FIGS. 6-8.

Example Dynamic Geofences

Figure 6:
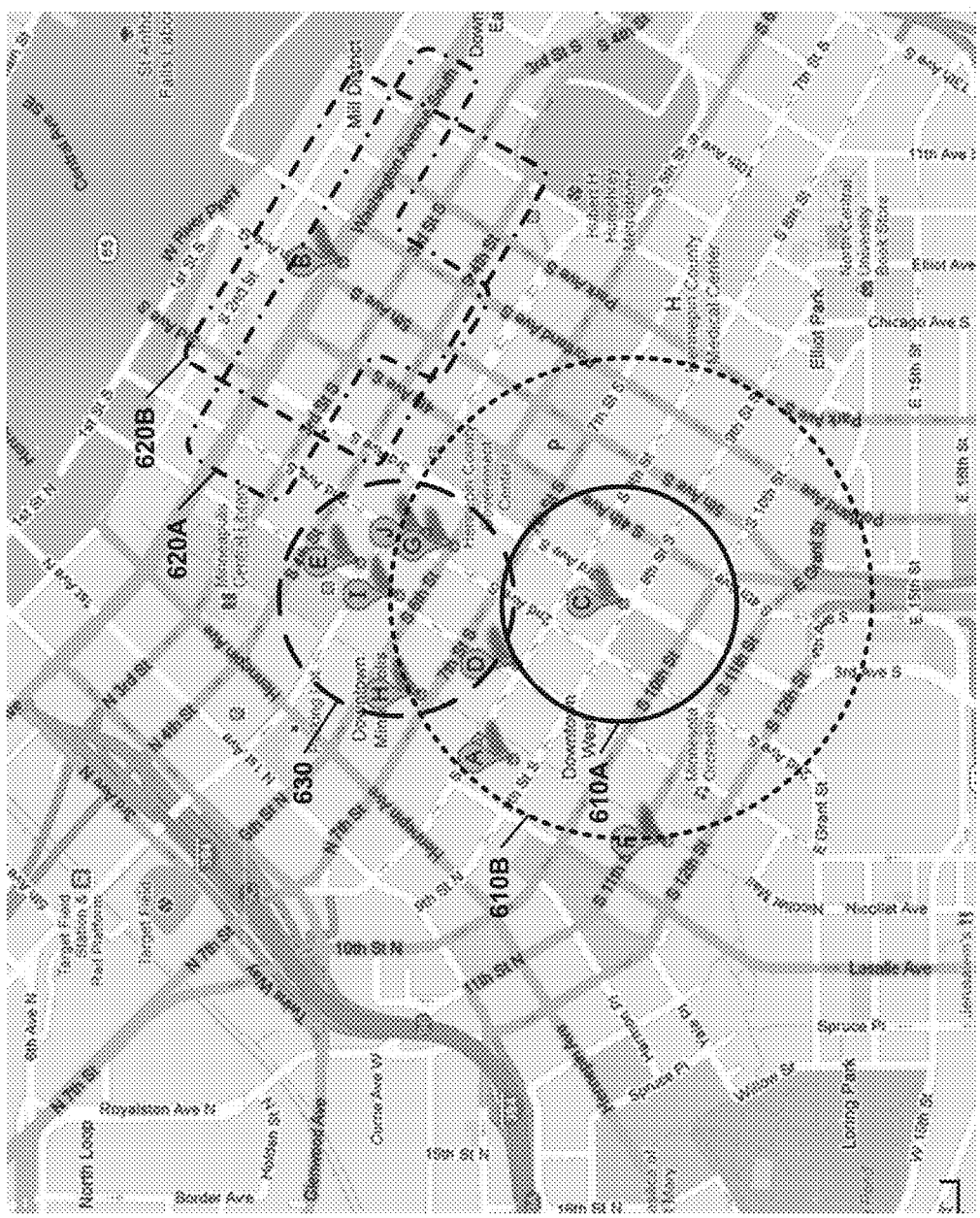
FIG. 6 is a diagram illustrating geofence updating via statistical analysis, according to an example embodiment.

FIG. 6 is a diagram illustrating geofence updating via statistical analysis, according to an example embodiment. The map display 600 includes a number of geofences (610-630) and highlighted POIs (A-J). In this example, three geofences are illustrated including two dynamic geofences 610 (610A, 610B) and 620 (620A, 620B) and one static geofence 630. All of the illustrated geofences can be used to target publications to recipients within a limited geographic area. Further, even geofence 630, which is illustrated as a static or unchanging, can be updated to change its size or shape at some future point in time.

In an example, geofence 610A can represent an initial state of geofence 610 generated around POI C. Geofence 610 represents a simple circular geofence centered on POI C. In this example, geofence 610 can include a geofence parameter defining the radius of the dynamic geofence. In an example, the geofence parameter for geofence 610 can be based on a target demographic, such as population density. In this example, the geofence 610 can shift between a first geofence parameter value resulting in geofence 610A and a second geofence parameter value resulting in geofence 610B due to shifts in the target demographic parameter. For example, if the target demographic parameter is population density, the shift may occur over the course of a day in the case of a downtown business district or over the course of the year for a vacation or retirement community.

In another example, geofence 620 represents a more complex geofence laid out to cover a particular geographic area, which may correlate to certain traffic patterns or local retail locations, among other things. Geofence 620 can be defined by a series of coordinates (latitude/longitude pairs), city block designations, or street intersections, among other things. Geofence 620 also illustrates the potential for a geofence to shift in shape due to changes in related demographics or other statistical data driving the particular shape. For example, an advertiser may want to avoid areas of a city that include competing locations, and such locations may change over time. In an example, a food truck operator may request that the network-based publication system 120 run a location-aware advertising campaign within the operating area for the food truck. Geofence 620 can illustrate two different operating areas 620A and 620B, which may represent areas targeted on different days of the week or a shift in areas based on changes in competitor locations. While Geofences 620A and 620B overlap, as illustrated in FIG. 6, there is no requirement for overlap between iterations of a dynamic geofence.

Example Methods

Figure 7:
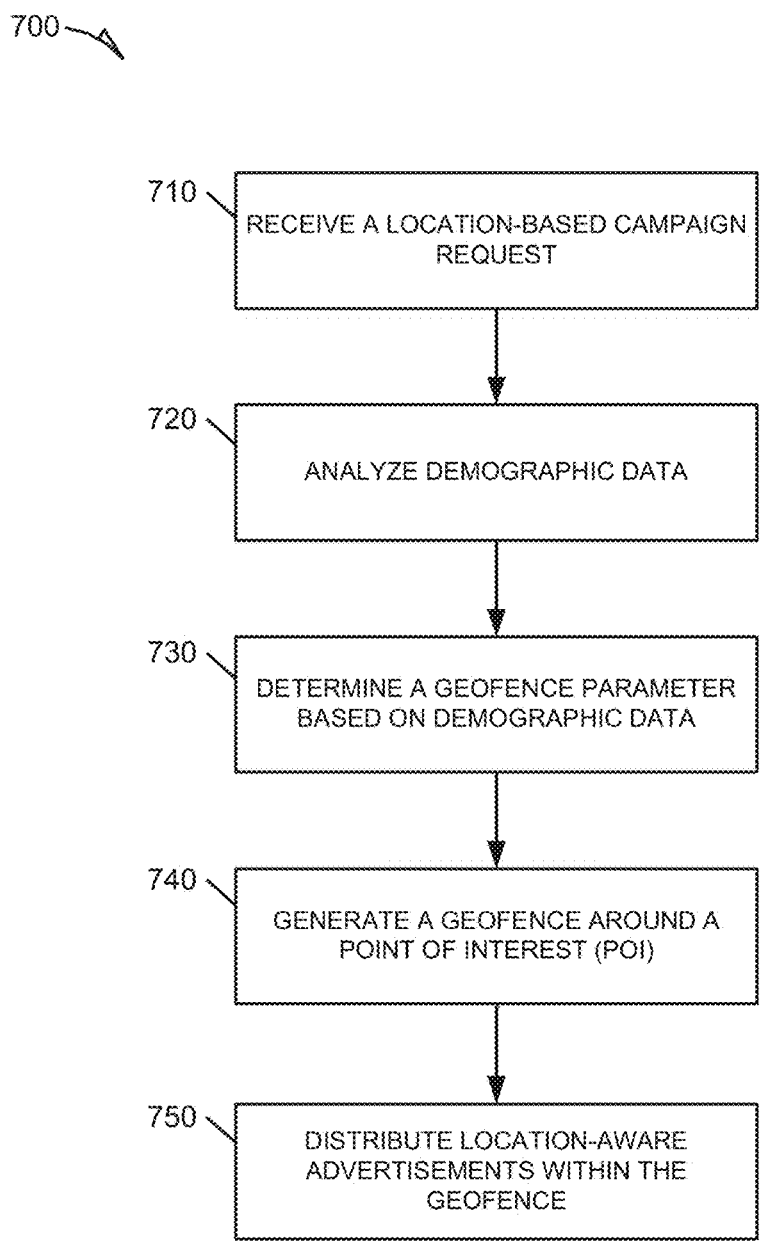
FIG. 7 is a flowchart illustrating a method of generating and using statistical dynamic geofences to assist in targeted publication distribution, according to an example embodiment.

FIG. 7 is a flowchart illustrating a method 700 of generating and using statistical dynamic geofences to assist in targeted publication distribution, according to an example embodiment. In an example, the method 700 can include operations for: receiving a location-based campaign request at 710, analyzing demographic data at 720, determining a geofence parameter at 730, generating a geofence at 740, and distributing advertisements at 750.

In an example, the method 700 can begin at 710 with the networked system 402 receiving a location-based campaign request from an advertiser. In this example, the location-based campaign request can include a list of POIs and a target demographic parameter. The target demographic parameter can control at leas one aspect of a geofence to be used for targeting publications around a POI.

At 720, the method 700 can continue with the networked system 402 analyzing demographic data related to the target demographic parameter. For example, if the target demographic parameter is average income, the networked system 402 can analyze demographic data from geographic areas around each POI in the list of POIs to determine the density of individuals within that geographic area that meet or exceed the target demographic parameter. A target demographic parameter can include population density, competitive POIs, income level, gender density, or age ranges, among other things. Further, in certain examples, multiple target demographic parameters may be defined and analyzed.

At 730, the method 700 can continue with the networked system 402 determining a geofence parameter, such as a radius, based on the analysis of the demographic data. In the average income example, the geofence parameter can be tied to the determined (or predicted) density of individuals meeting or exceeding the target average income. In areas with a high density, the geofence parameter may be reduced (e.g., a smaller radius geofence may be centered on a POI in that geographic area); conversely, if the density is low, the geofence parameter may be increased.

At 740, the method 700 can continue with the networked system 402 generating a geofence around at least one of the POIs in the list of POIs. As discussed above, the geofence generation can be based at least in part on the geofence parameter. In certain examples, the geofence parameter may include a list of coordinates, thereby allowing the geofence parameter to alter the size and shape of the generated geofence.

At 750, the method 700 can conclude with the networked system 402 distributing location-aware advertisements or similar publications) within the geofence generated around the POI. In an example, the advertisements can be distributed to a plurality of mobile devices, such as mobile devices 115, located within the geofence area. The networked system 402 can use any of the methods discussed above, or known in the art, to determine the locations of the mobile devices 115.

Though arranged serially in the example of FIG. 7, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Figure 8:
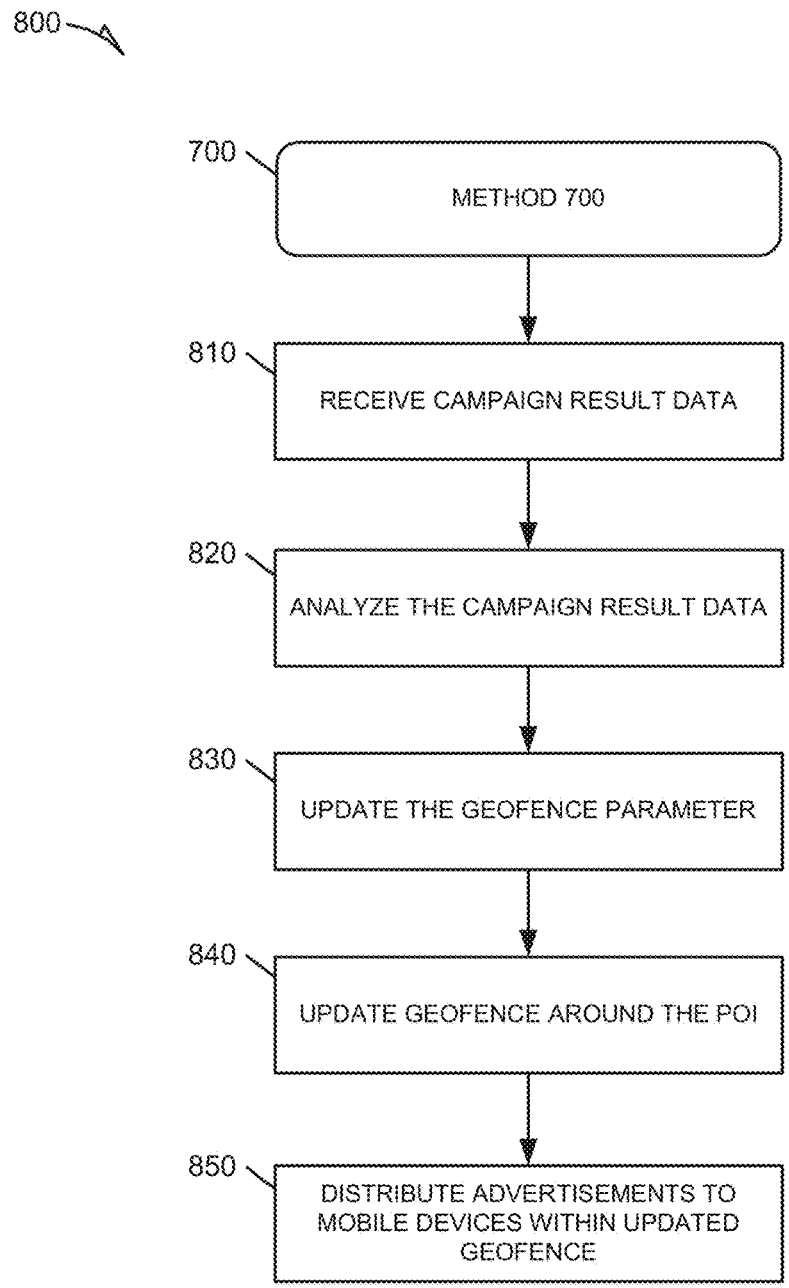
FIG. 8 is a flowchart illustrating a method of updating statistical dynamic geofences to refine targeted publication distribution, according to an example embodiment.

FIG. 8 is a flowchart illustrating a method 800 of updating statistical dynamic geofences to refine targeted publication distribution, according to an example embodiment. As illustrated in FIG. 8, in this example, the process illustrated by method 800 can occur after the process of generating a geofence discussed with respect to FIG. 7. In this example, the method 800 can include operations such as: receiving campaign results data at 810, analyzing the campaign results data at 820, updating the geofence parameter at 830, updating the geofence at 840, and distributing advertisements within the updated geofence at 850.

In an example, the method 800 can begin at 810 with the networked system 402 receiving campaign results data. The campaign results data can be collected based on the initial distribution of a publication (e.g., advertisement) within the initially generated geofence. At 820, the method 800 can continue with the networked system 402 analyzing the campaign results data in reference to a target demographic parameter or other campaign driven parameter. In an example, the campaign results data can be correlated with demographic information related to the users targeted by the initial publication campaign.

At 830, the method 800 can continue with the networked system 402 updating the geofence parameter based at least in part on the analysis of the campaign results data. In an example, the geofence parameter can be linked to the density of males over the age of 35, and analysis of the campaign result data may indicate that the projected density is different than the original demographic data analysis indicated. Accordingly, the networked system 402 can adjust to the detected change.

At 840, the method 800 can continue with the networked system 402 updating the geofence around the POI based on the updated geofence parameter. At 850, the method 800 can conclude with the networked system 402 distributing a second wave of advertising to mobile devices detected within the updated geofence area.

Though arranged serially in the example of FIG. 8, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
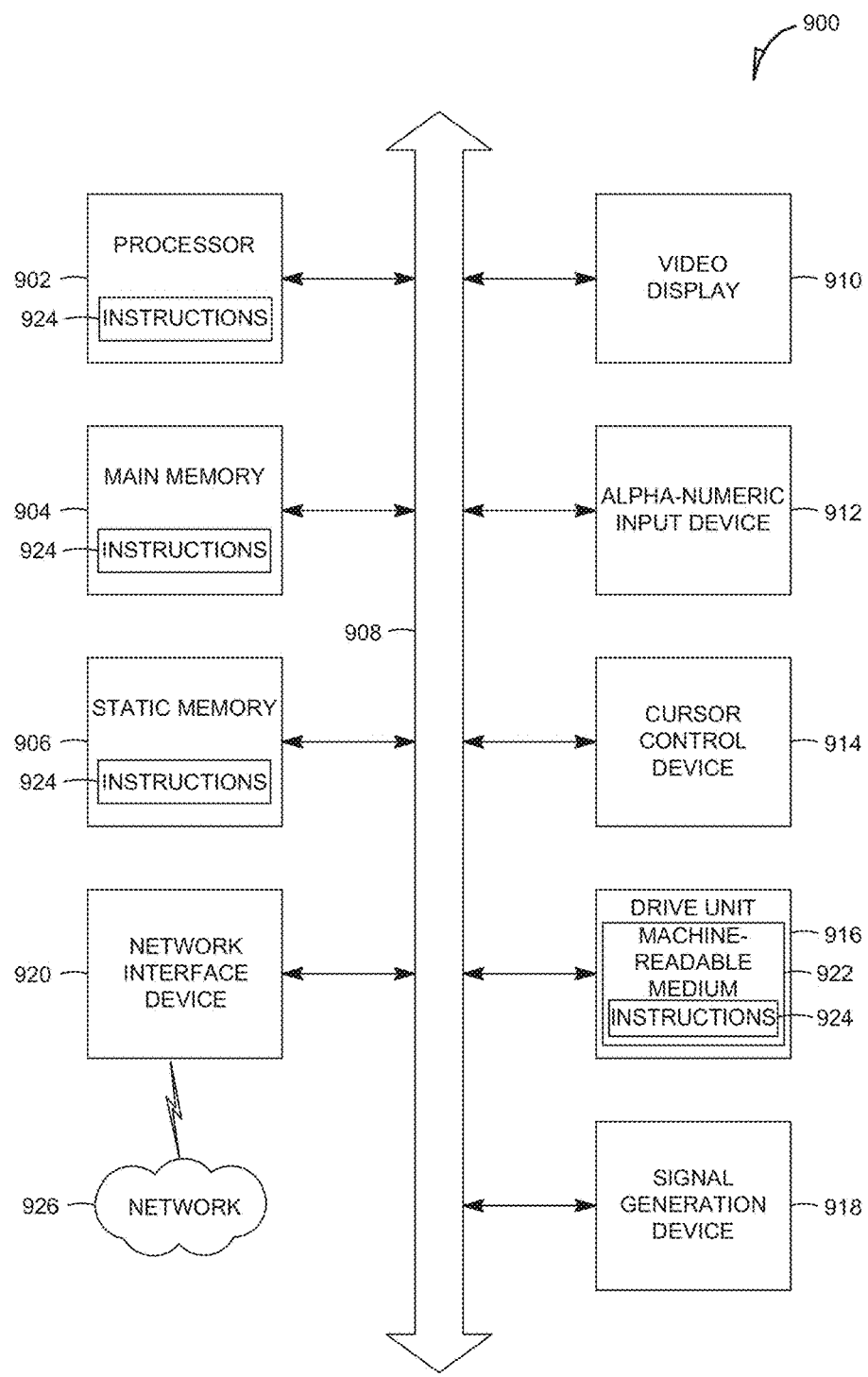
FIG. 9 is a diagrammatic representation of a machine in the example form of a computer system within which a set of instructions for causing the machine to perform any one or more of the methodologies discussed herein may be executed.

FIG. 9 is a block diagram of a machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal displays (LCD) or a cathode ray tube (CRT)). The computer system 900 also includes an alpha-numeric input device 912 (e.g., a keyboard), a cursor control (user interface (UI) navigation) device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or used by any one or more of the methodologies or functions described herein. The instructions 924 may also reside, completely or at least partially, within the main memory 904, static memory 906, and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention includes:

1. A method to transmit a publication to mobile devices of a requested target number of users within a statistical dynamic geofence by dynamically changing a size or a shape of the statistical dynamic geofence over the course of a day, the method comprising:
   receiving, by a server using one or more processors, a location-based campaign request including a point of interest (POI) and a target demographic parameter, the POI representing a geographical location and the target demographic parameter defining a type of user;
   gathering demographic data for a geographic area surrounding the POI, the demographic data including data related to a number of users located within the geographic area at different times;

determining, based on the demographic data for the geographic area, a first population density of users defined by the target demographic parameter that are located within the geographic area during a first portion of the day, and a second population density of users defined by the target demographic parameter that are located within the geographic area during a second portion of the day;

determining, based on the first population density and the requested target number of users defined by the target demographic parameter, a first geofence parameter defining a first size or shape of the statistical dynamic geofence for the geographic area to encompass the requested target number of users defined by the target demographic parameter that are located within bounds of the statistical dynamic geofence defined by the first geofence parameter;

determining, based on the second population density and the requested target number of users defined by the target demographic parameter, a second geofence parameter defining a second size or shape of the statistical dynamic geofence for the geographic area to encompass the requested target number of users defined by the target demographic parameter that are located within bounds of the statistical dynamic geofence defined by the second geofence parameter during the second portion of the day;

during the first portion of the day:
generating the statistical dynamic geofence having the first size or shape defined by the first geofence parameter for the geographic area around the POI; and transmitting, over a network from the server, first instructions for causing display of the publication on respective user interfaces of mobile devices located within the statistical dynamic geofence at the first size or shape defined by the first geofence parameter; and during the second portion of the day:
adjusting the statistical dynamic geofence to the second size or shape defined by the second geofence parameter for the geographic area around the POI; and transmitting, over the network from the server, second instructions for causing display of the publication on respective user interfaces of mobile devices located within the adjusted statistical dynamic geofence at the second size or shape defined by the second geofence parameter.

2. The method of claim 1, wherein the transmission of the first instructions cause display of the publication on respective user interfaces of a first group of mobile devices, and wherein the transmission of the second instructions cause display of the publication on respective user interfaces of a second group of mobile devices.

3. The method of claim 2, wherein the first group of mobile devices is different than the second group of mobile devices.

4. The method of claim 1, further comprising:
updating the first or second geofence parameter in response to determining that an actual number of users that viewed the publication is less than the requested target number of users.

5. The method of claim 4, wherein the updating the first or second geofence parameter adjusts the first or second size or shape of the statistical dynamic geofence in order to increase a predicted number of mobile devices within the statistical dynamic geofence.

6. The method of claim 4, wherein the updating the first or second demographic parameters adjusts the first or second shape of the statistical dynamic geofence.

7. The method of claim 1, wherein the target demographic parameter is based on one or more parameters describing a minimum income threshold, average income, average education level, active mobile device usage, a density of males, a density of females, or a predefined age range.

8. A server to transmit a publication to mobile devices of a requested target number of users within a statistical dynamic geofence by dynamically changing a size or a shape of the statistical dynamic geofence over the course of a day, the server comprising:

one or more computer processors; and
one or more computer-readable mediums storing instructions that, when executed by the one or more computer processors, cause the server to perform operations comprising:

receiving a location-based campaign request including a point of interest (POI) and a target demographic parameter, the POI representing a geographical location and the target demographic parameter defining a type of user;

gathering demographic data for a geographic area surrounding the POI, the demographic data including data related to a number of users located within the geographic area at different times;

determining, based on the demographic data for the geographic area, a first population density of users defined by the target demographic parameter that are located within the geographic area during a first portion of the day, and a second population density of users defined by the target demographic parameter that are located within the geographic area during a second portion of the day;

determining, based on the first population density and the requested target number of users defined by the target demographic parameter, a first geofence parameter defining a first size or shape of the statistical dynamic geofence for the geographic area to encompass the requested target number of users defined by the target demographic parameter that are located within bounds of the statistical dynamic geofence defined by the first geofence parameter;

determining, based on the second population density and the requested target number of users defined by the target demographic parameter, a second geofence parameter defining a second size or shape of the statistical dynamic geofence for the geographic area to encompass the requested target number of users defined by the target demographic parameter that are located within bounds of the statistical dynamic geofence defined by the second geofence parameter during the second portion of the day;

during the first portion of the day:
generating the statistical dynamic geofence having the first size or shape defined by the first geofence parameter for the geographic area around the POI; and transmitting, over a network from the server, first instructions for causing display of the publication on respective user interfaces of mobile devices located within the statistical dynamic geofence at the first size or shape defined by the first geofence parameter; and during the second portion of the day:
adjusting the statistical dynamic geofence to the second size or shape defined by the second geofence parameter for the geographic area around the POI; and
transmitting, over the network from the server, second instructions for causing display of the publication on respective user interfaces of mobile devices located within the adjusted statistical dynamic geofence at the second size or shape defined by the second geofence parameter.

9. The server of claim 8, wherein the transmission of the first instructions cause display of the publication on respective user interfaces of a first group of mobile devices, and wherein the transmission of the second instructions cause display of the publication on respective user interfaces of a second group of mobile devices.

10. The server of claim 9, wherein the first group of mobile devices is different than the second group of mobile devices.

11. The server of claim 9, the operations further comprising:
updating the first or second geofence parameter in response to determining that an actual number of users that viewed the publication is less than the requested target number of users.

12. The server of claim 11, wherein the updating the first or second geofence parameter adjusts the first or second size or shape of the statistical dynamic geofence in order to increase a predicted number of mobile devices within the statistical dynamic geofence.

13. The server of claim 11, wherein the updating the first or second demographic parameters adjusts the first or second shape of the statistical dynamic geofence.

14. The server of claim 8, wherein the target demographic parameter is based on one or more parameters describing a minimum income threshold, average income, average education level, active mobile device usage, a density of males, a density of females, or a predefined age range.

15. A non-transitory computer-readable medium storing instructions that, when executed by one or more computer processors of a server, cause the server to perform operations to transmit a publication to mobile devices of a requested target number of users within a statistical dynamic geofence by dynamically changing a size or a shape of the statistical dynamic geofence over the course of a day, the operations comprising:
receiving a location-based campaign request including a point of interest (POI) and a target demographic parameter, the POI representing a geographical location and the target demographic parameter defining a type of user;
gathering demographic data for a geographic area surrounding the POI, the demographic data including data related to a number of users located within the geographic area at different times;
determining, based on the demographic data for the geographic area, a first population density of users defined by the target demographic parameter that are located within the geographic area during a first portion of the day, and a second population density of users defined by the target demographic parameter that are located within the geographic area during a second portion of the day;
determining, based on the first population density and the requested target number of users defined by the target demographic parameter, a first geofence parameter defining a first size or shape of the statistical dynamic geofence for the geographic area to encompass the requested target number of users defined by the target demographic parameter that are located within bounds of the statistical dynamic geofence defined by the first geofence parameter;
determining, based on the second population density and the requested target number of users defined by the target demographic parameter, a second geofence parameter defining a second size or shape of the statistical dynamic geofence for the geographic area to encompass the requested target number of users defined by the target demographic parameter that are located within bounds of the statistical dynamic geofence defined by the second geofence parameter during the second portion of the day;
during the first portion of the day:
generating the statistical dynamic geofence having the first size or shape defined by the first geofence parameter for the geographic area around the POI; and
transmitting, over a network from the server, first instructions for causing display of the publication on respective user interfaces of mobile devices located within the statistical dynamic geofence at the first size or shape defined by the first geofence parameter; and
during the second portion of the day:
adjusting the statistical dynamic geofence to the second size or shape defined by the second geofence parameter for the geographic area around the POI; and
transmitting, over the network from the server, second instructions for causing display of the publication on respective user interfaces of mobile devices located within the adjusted statistical dynamic geofence at the second size or shape defined by the second geofence parameter.

16. The non-transitory computer-readable medium of claim 15, wherein the transmission of the first instructions cause display of the publication on respective user interfaces of a first group of mobile devices, and wherein the transmission of the second instructions cause display of the publication on respective user interfaces of a second group of mobile devices.

17. The non-transitory computer-readable medium of claim 16, wherein the first group of mobile devices is different than the second group of mobile devices.

18. The non-transitory computer-readable medium of claim 16, the operations further comprising:
updating the first or second geofence parameter in response to determining that an actual number of users that viewed the publication is less than the requested target number of users.

19. The non-transitory computer-readable medium of claim 18, wherein the updating the first or second geofence parameter adjusts the first or second size or shape of the statistical dynamic geofence in order to increase a predicted number of mobile devices within the statistical dynamic geofence.

20. The non-transitory computer-readable medium of claim 18, wherein the updating the first or second demographic parameters adjusts the first or second shape of the statistical dynamic geofence.

* * * * *